United States Patent [19]
Mehew et al.

[11] Patent Number: 6,068,065
[45] Date of Patent: May 30, 2000

[54] ROLLER ATTACHMENT FOR ROAD GRADER

[76] Inventors: Wayne Mehew; Carolyn Mehew, both of Box 210, Del Bonita, Alberta, Canada, T0K 0S0

[21] Appl. No.: 09/062,615

[22] Filed: Apr. 20, 1998

[51] Int. Cl.[7] .............................. E02F 3/12; E02F 3/64; E02F 3/76; A01B 63/00; A01B 5/00
[52] U.S. Cl. .................... 172/785; 172/784; 172/171; 172/245; 172/252
[58] Field of Search .................... 172/780, 785, 172/133, 781, 197, 784, 799.5, 149, 150, 151, 168, 180, 245, 247, 250, 251, 252, 253, 170, 171, 172, 174, 175; 37/381; 414/723

[56] References Cited

U.S. PATENT DOCUMENTS

| | | | |
|---|---|---|---|
| 1,806,054 | 5/1931 | Gardner | 172/781 |
| 2,036,598 | 4/1936 | Miller et al. | 172/252 |
| 2,188,435 | 1/1940 | Hargrave | 172/784 |
| 2,197,549 | 4/1940 | Hargrave et al. | 37/244 |
| 2,925,870 | 2/1960 | Michelsen | 172/146 |
| 3,136,078 | 6/1964 | Renault | 172/548 |
| 3,246,407 | 4/1966 | Miller | 172/168 |
| 3,287,834 | 11/1966 | Hopkins | 172/247 |
| 3,693,722 | 9/1972 | Brown | 172/4.5 |
| 3,852,945 | 12/1974 | Berry et al. | 56/12.7 |
| 4,354,321 | 10/1982 | Weatherholt | 37/231 |
| 4,930,582 | 6/1990 | Goss | 172/188 |
| 5,106,165 | 4/1992 | Lattman | 299/25 |

*Primary Examiner*—Thomas B. Will
*Assistant Examiner*—Nathan Mammen
*Attorney, Agent, or Firm*—Thomas E. Malyszko

[57] ABSTRACT

An attachment assembly is provided for quickly and conveniently mounting a roller onto and immediately ahead of an elongate blade of a road grader or other vehicle which manipulates and moves the blade over a ground surface. The portable roller has an elongate body with a continuous cylindrical outer surface for contacting and working the ground surface, and an axle element about which the roller rotates and which protrudes from each opposed end of the roller body. The attachment assembly is removably receivable on the blade and rotatably holds the roller by the protruding axle element. The location and orientation of the roller relative to the ground surface is controlled by manipulating the blade. The assembly provides an alternative to traditional road grading, namely by allowing a road grader to carry a roller to simultaneously level and compact a ground surface, such as a gravel road.

16 Claims, 6 Drawing Sheets

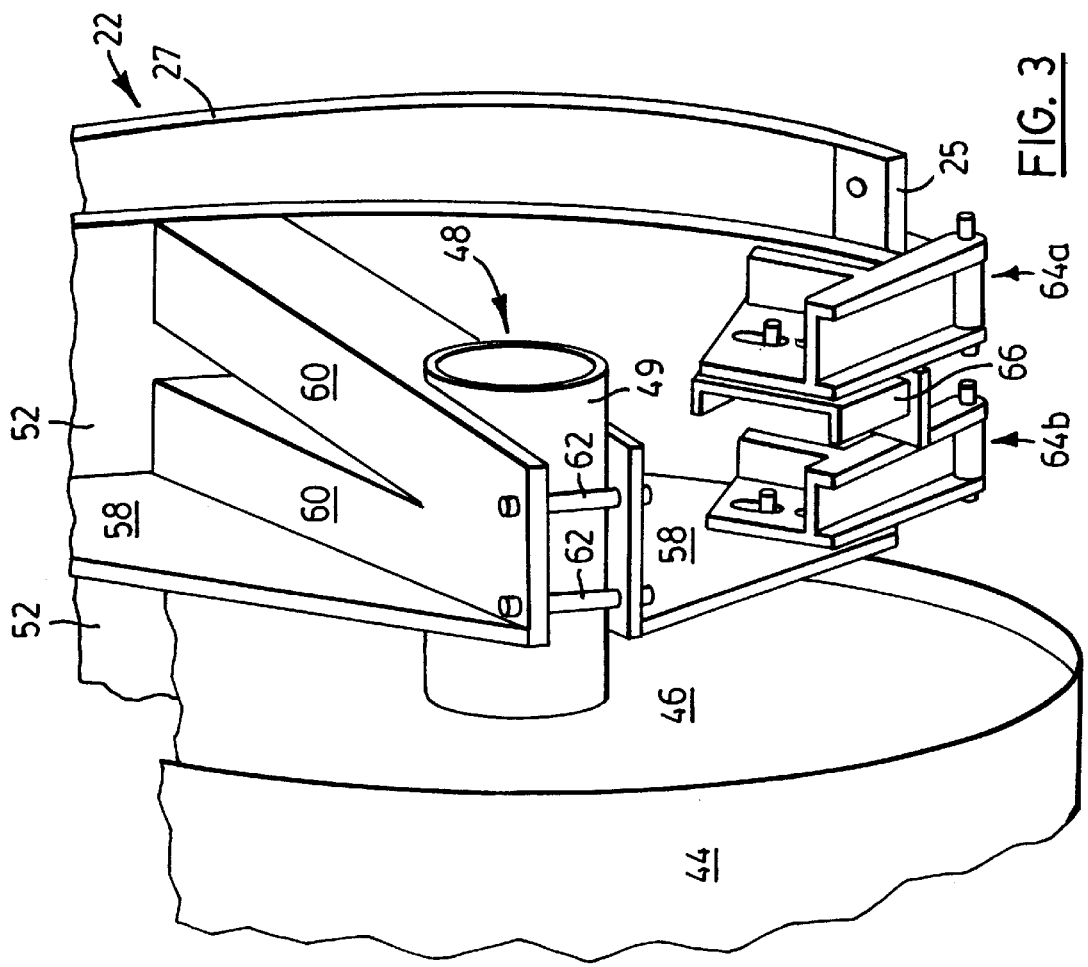
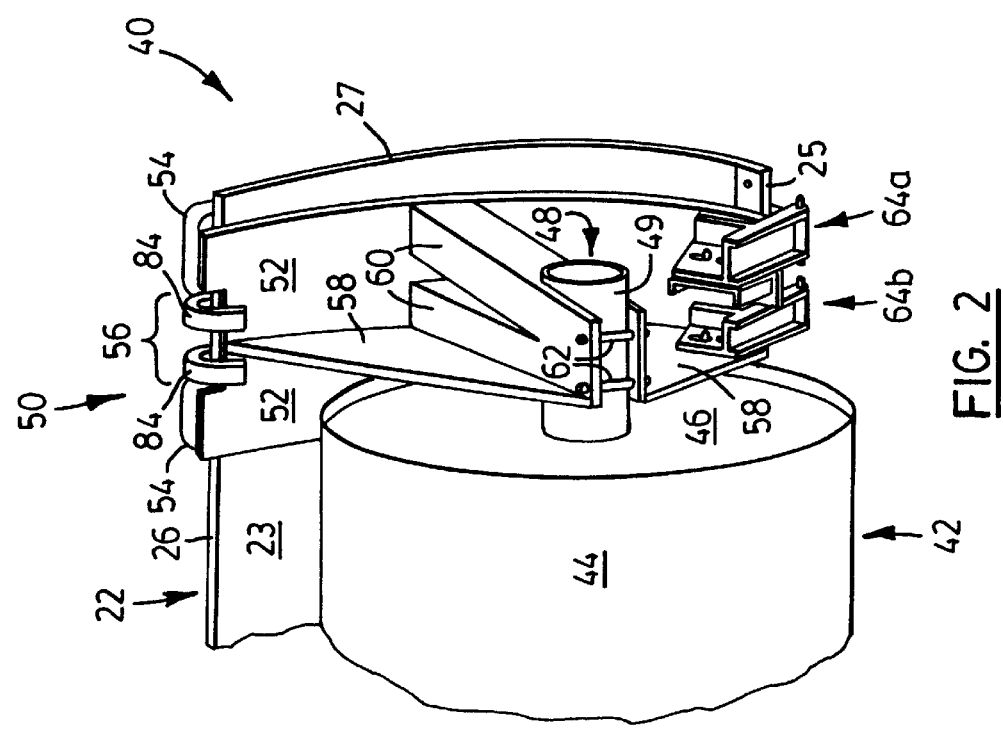

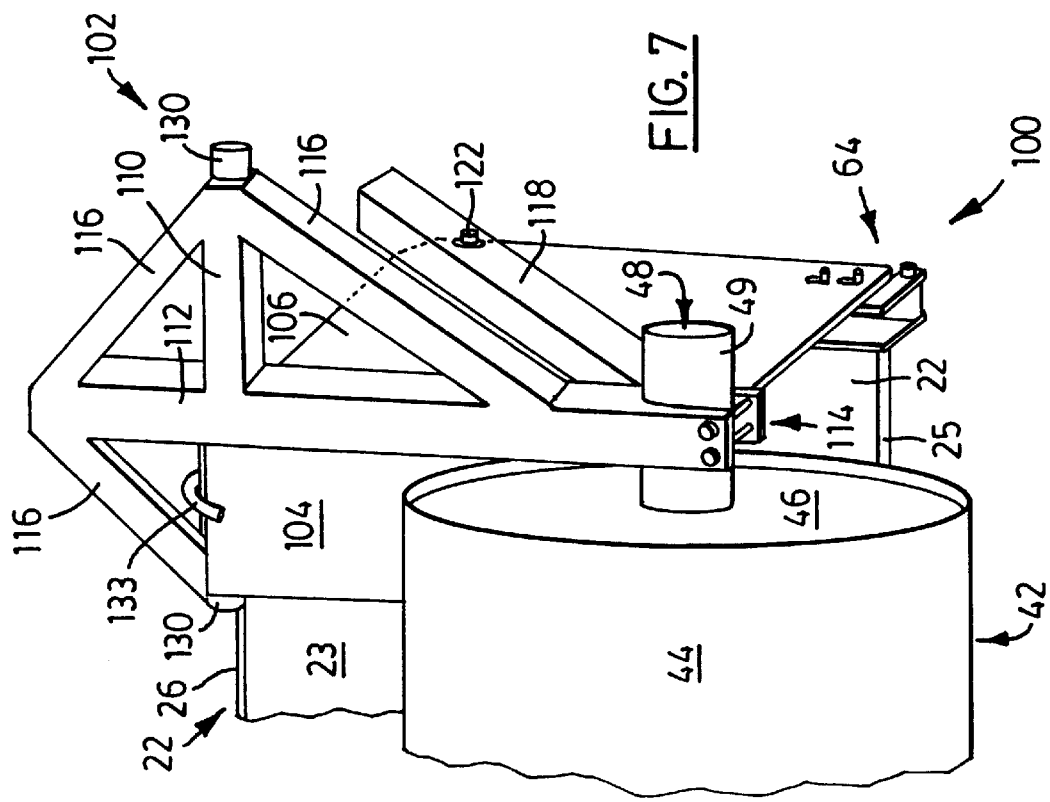
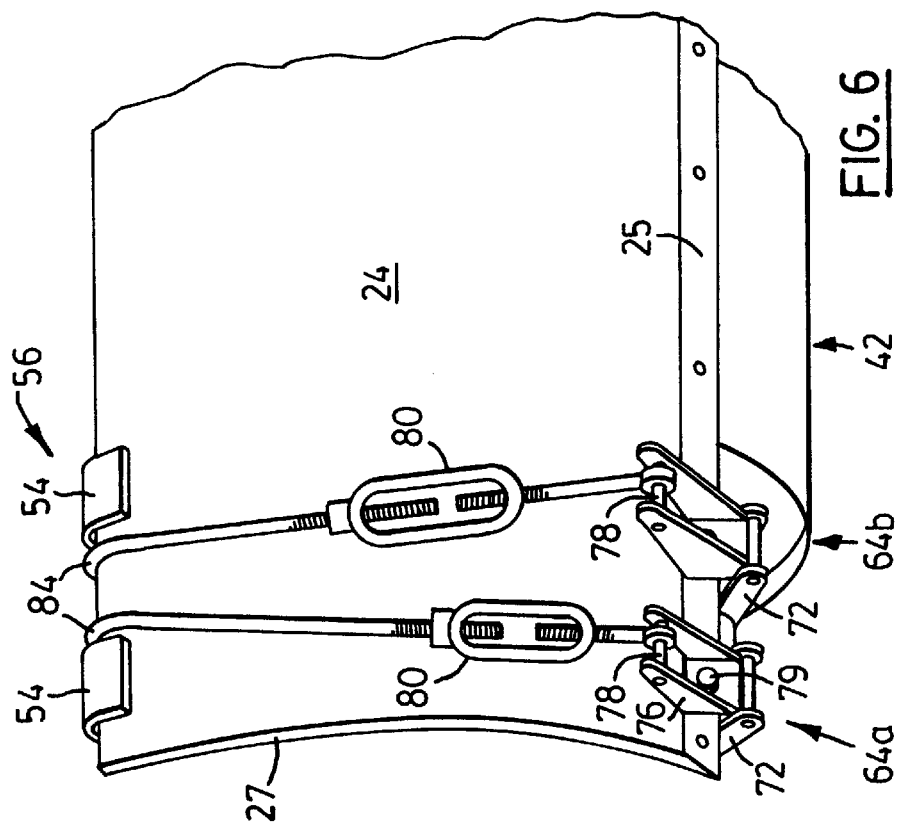

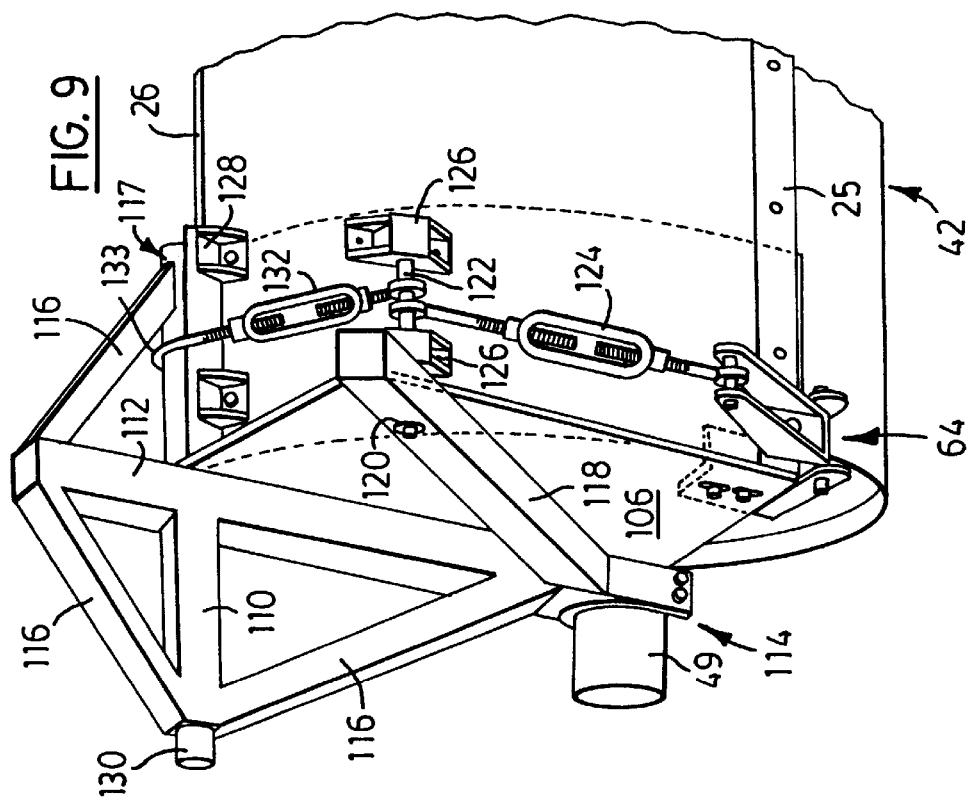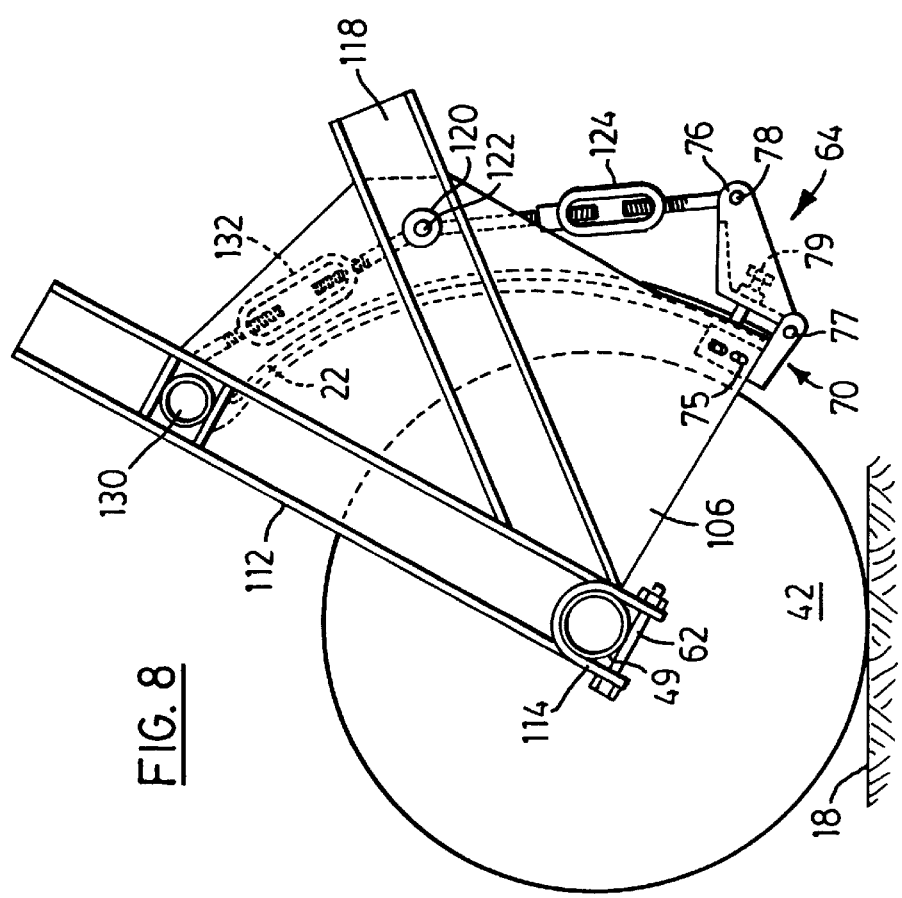

6,068,065

ROLLER ATTACHMENT FOR ROAD GRADER

FIELD OF THE INVENTION

The present invention relates to accessories for road maintenance machinery, and in particular to an attachment for a road grader.

BACKGROUND OF THE INVENTION

Although dirt roads are popular in both rural and urban settings because they may be readily constructed at much less expense than paved roadways, a principal disadvantage of dirt roads is that they require frequent maintenance to remove irregularities such as depressions or pot-holes and surface ripples or ridges caused by vehicular traffic and weather conditions. Dirt roads in rural and farming area tend to deteriorate more quickly due to heavy agricultural machinery and truck use, particularly during spring thaws.

Road graders are typically used to re-level a dirt road surface. Although the grader's blade can scrape off the ripples and flatten the road surface, it only fills the pot-holes with relatively loose dirt or other road material. The road grader has no ability to compact the dirt in the pot-holes, and so the potholes tend to reappear soon after the road is re-leveled. A compactor, such as a road roller or steam roller, is required to properly pack such dirt filled depressions after grading, but it is rarely if ever employed due to added manpower, machinery and maintenance costs.

What is desired therefore is a novel apparatus which overcomes the limitations and problems of prior art graders. Preferably it should provide a fairy simple, portable and low cost attachment mountable to a road grader for working a ground surface (such as a dirt or gravel road), namely smoothing out and compacting the surface, as the grader moves along the surface. The attachment should be readily mountable to the road grader's blade and be able to pivot therewith to allow an operator to select a desired orientation of the blade and attachment relative to the surface being worked. The attachment should allow the operator, without the aid of others, to readily mount and dismount the attachment onto and off of the blade. The attachment's position on to the blade may be adjustable to accommodate various rollers.

SUMMARY OF THE INVENTION

In one aspect the invention provides a device for working a ground surface and mountable to an elongate blade of a vehicle which moves said blade along said ground surface and manipulates said blade thereover, said blade having a lower ground engaging edge, an opposed upper edge, a front face and a rear face, said device comprising: a roller having an elongate body with a continuous cylindrical outer surface for contacting and working said ground surface and an axle element about which said roller rotates wherein a portion of said axle element protrudes from each opposed end of said body; and, an attachment assembly for mounting said roller immediately ahead of said blade, said attachment assembly being removably receivable on said blade and adapted to rotatably hold said roller by said axle element, wherein the location and orientation of said roller relative to the ground surface is controlled by manipulating said blade.

In another aspect the invention provides an assembly for mounting a roller onto a vehicle for manipulating and moving an elongate blade over a ground surface, said blade having a lower ground engaging edge, an opposed upper edge, a front face and a rear face, and said roller having an elongate body with a continuous cylindrical outer surface for contacting and working said ground surface and an axle element about which said roller rotates, said axle element protruding from each opposed end of said body, said assembly comprising: an attachment for mounting said roller immediately ahead of said blade, said attachment being removably receivable on said blade and adapted to rotatably hold said roller by said axle element, wherein the location and orientation of said roller relative to the ground surface is controlled by manipulating said blade.

In yet another aspect the invention provides a road grader having an elongate blade for grading a ground surface, the improvement comprising an attachment for mounting a roller immediately ahead of said blade, said roller having an elongate body with a continuous cylindrical outer surface for contacting and working said ground surface and an axle element about which said roller rotates, said axle element protruding from each opposed end of said body, said attachment being removably receivable on said blade and adapted to rotatably hold said roller by said axle element.

DESCRIPTION OF THE DRAWINGS

Embodiments of the invention will now be described, by way of example only, with reference to the accompanying drawings, wherein:

FIG. 2 is a perspective view, from the front, of the first embodiment of the roller attachment;

FIG. 3 is close-up view of the roller attachment of FIG. 2;

FIG. 6 is a perspective view, from the rear, of the roller attachment of FIG. 2;

FIG. 7 is a perspective view, from the front, of a second embodiment of the roller attachment;

FIG. 8 is a side view of the roller attachment of FIG. 7;

FIG. 9 is a perspective view, from the rear, of the roller attachment of FIG. 7;

DESCRIPTION OF PREFERRED EMBODIMENTS

Figure 1:
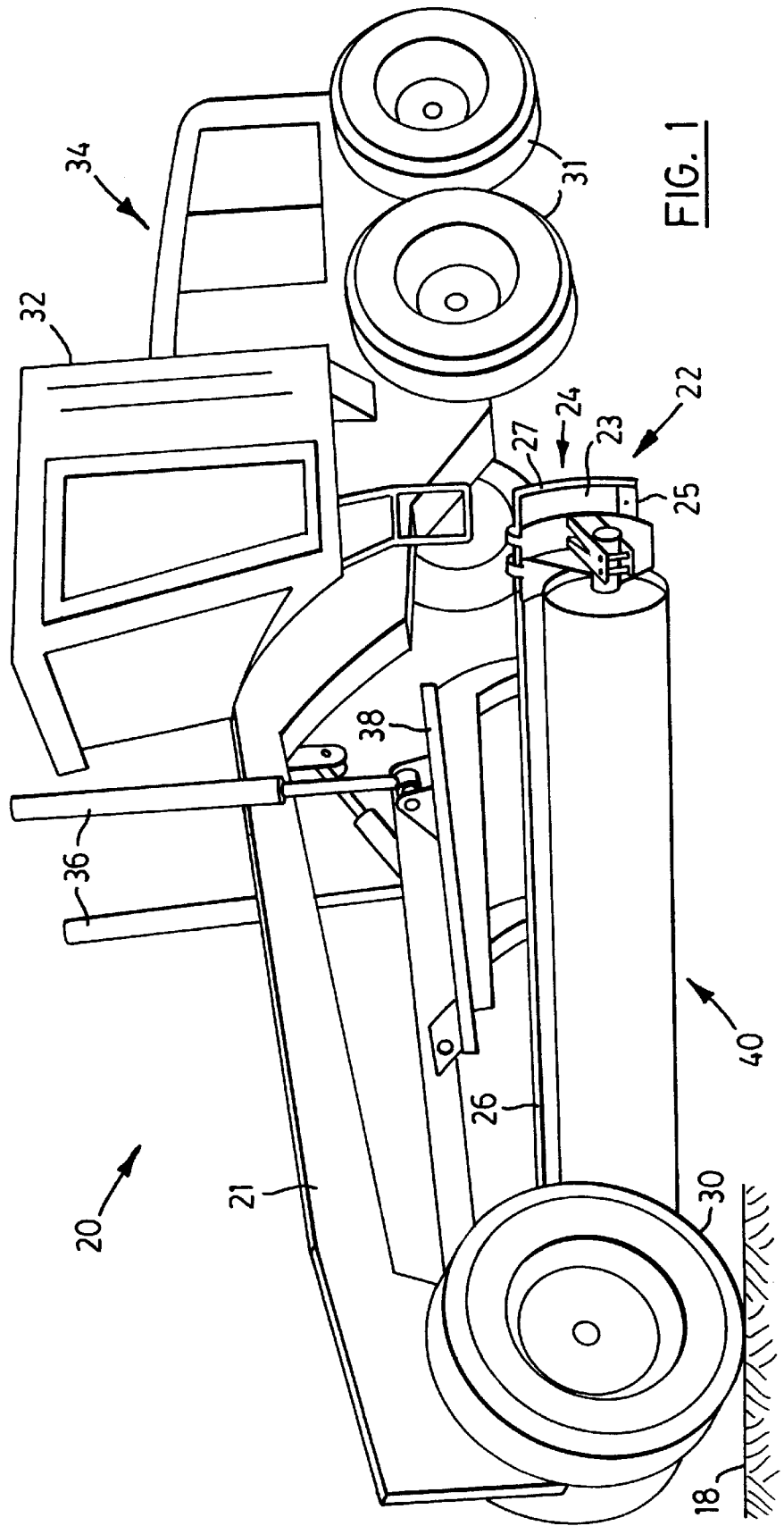
FIG. 1 is a perspective view of a road grader vehicle carrying a roller attachment according to a first embodiment of the present invention on the road grader's blade.

A roller attachment according to a first embodiment of the present invention, generally designated by reference numeral 40 in FIG. 1, is shown mounted to a typical elongate grader blade 22 of a conventional road grader 20 chosen herein for illustrative purposes. It will be understood that although use of the roller attachment 40 on a road grader is preferred for several reasons, such as ease of positioning of the blade to a desired orientation relative to the ground surface 18, the roller attachment may be adapted for use on similar blades of other road construction or maintenance vehicles, earth moving vehicles and heavy machinery such as bulldozers, backhoes and the like.

The illustrated road grader 20 has front steering wheels 30, rear wheels 31 driven by a motor, namely an internal combustion engine 34, for propelling the grader, and a cab 32 from which an operator controls the vehicle, including the blade. A pair of hydraulically operated cylinders 36 mounted to the grader's main frame 21 support an adjustable turntable 34 which carries the blade 22 so that the blade may be adjusted in three dimensions, namely in elevation above the ground 18, and angularly about an upstanding axis and about a horizontal axis running generally parallel to the main frame 21 as is known in the art. The arched blade 22 has a concave front face 23, a convex rear face 24, a lower ground engaging edge 25 and an opposed upper edge 26 extending generally parallel thereto, and opposed upstanding side edges 27.

In the description given hereafter, it will be understood that although only one side of the road grader 20, blade 22 and roller attachment 40 is being described, these items are generally symmetrical about a vertical plane extending along the center of the road grader.

A first adjustable version of the roller attachment 40 is shown in greater detail in FIGS. 2 to 6. The roller attachment generally comprises a roller 42 and a support arrangement 50 for mounting the roller on the blade 22 immediately ahead of its concave front face 23. The roller 42 has an elongate cylindrical body formed by a continuous outer surface 44, closed at its ends by end plates 46. The roller body may be have a solid core, or, preferably, is hollow for receiving a substance therein, such as sand or water for instance, through an opening (not shown) in one or both end plates 46 for weighing the roller down. The roller is adapted to rotate about a longitudinal axis of an axle 48 passing through the roller body and extending away from each end plate 46. A bearing housing or sleeve 49 is located about the externally exposed portion of the axle 49 to allow the roller to rotate freely relative to the support arrangement 50 and blade 26. Depending on the length of the roller body, one or more radial plates (not shown) extending between the axle 48 and the roller's outer surface 44 may be provided within the roller body to stiffen the roller and prevent buckling.

The support arrangement 50 is removably mounted to the blade 22, as described later. The arrangement has an arched first support element or back plate 52 extending between the blade's upper and lower edges 26, 25, and juxtaposed with the blade's front face 23. The back plate 52 is supported or suspended from the blade's upper edge 26 by two spaced c-shaped back plate hooks 54 forming a gap 56 therebetween. A brace assembly includes a perpendicular second support element or side plate 58 which extends forwardly from (and generally bisects) the back plate 52 along a centerline thereof. The side plate 58 acts as a stiffener for two tubular brace arms 60 extending radially from the back plate 52, the side plate 58 being located intermediate the roller and brace arms. The terminal ends of the brace arms 60 form a mouth for accepting the bearing housing 49, which is fixedly clamped therein by several appropriate fasteners 62, such as conventional bolts or pins.

Figure 5:
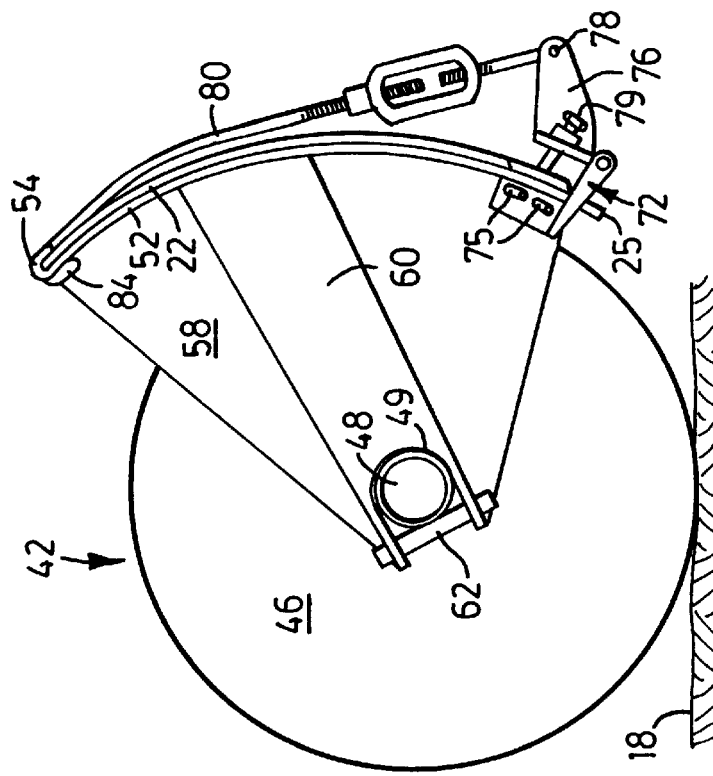
FIG. 5 is a side view of the roller attachment of FIG. 2.

The support arrangement further includes a linkage mechanism for fixing the back plate 52 to the blade at a desired location thereon so as to accommodate various lengths of rollers. The linkage mechanism incorporates a pair of substantially similar binding hinge assemblies 64a and 64b at the bottom of the back plate 52 for engaging the blade's lower edge 25, and a puller 80 extending behind the blade for pulling each binding hinge assembly against the blade's lower edge 25 to fix the back plate on the blade. The first binding hinge assembly has a c-shaped member 66 fixed to the bottom portion of the back plate 52 which extends radially outwardly, and two apertures therein for receiving adjustment bolts 68 therethrough. The c-shaped member is omitted for the second hinge assembly 64b since the apertures for the adjustment bolts 68 are made through a lower portion of the side plate 58. A t-shaped binder member 70 has a base 72 which extends rearwardly beneath the blade's lower edge 25, and an L-shaped stem 74 with a first leg for sandwiching the back plate 52 with the blade's front face 23, and a second leg for engaging the c-shaped member 66. The stem's second leg has two oblong slots 75 for receiving the bolts 68 therethrough. The oblong slots 75 allow the binder's base 72 to be butted up against the lower edges of the back plate and/or the blade prior to securing the binder 70 to the c-shaped member 66 using the bolts 75 and corresponding nuts (not shown). A binding brace 76 is hinged via a first hinge pin 77 to a rearward portion of the binder's base 72, and carries an adjustment bolt 79 (as best seen in FIGS. 5 & 6) to engage the blade's rear face 24 for sandwiching the blade and back plate 52 with the binder's stem 74. Hence, the binding hinge assemblies 64a & 64b may be employed for a wide range of blades with varying thickness.

The puller 80 has a bottom end 82 pivotally connected to the binding brace 76 via a second hinge pin 78 located on the far side of the binding brace opposite the first hinge pin 77. The puller's top end forms a hook 84 to extend across the blade's upper edge 26 and over onto the back plate 52 through the gap 56. The puller 80 is a turn buckle in the embodiment shown, although other suitable pulling means may be used such as load binders. As the turn buckle 80 is tightened, the binder's base 72 pushes up against the lower edge of the blade 22, and the adjustment bolt 79 on the binding brace 76 increasingly clamps or grips the back plate with the blade.

It may now be better appreciated how the roller and first embodiment of the support arrangement is installed on the grader blade. The roller may be resting in a shallow ditch or depression in the ground 18 for ease of moving the grader over the roller to locate the roller between the front and rear wheels 30, 31. The grader blade should be lowered and brought behind the roller so that it sits immediately ahead of the blade. The blade is then tipped forwardly (i.e. rotated counterclockwise in the FIG. 5 view) so that the back plate hooks 54 can be inserted over the blade's upper edge 26 at both ends of the roller. At this point the back plate 52, and in particular the mouth of the brace arms 60, has already been inserted onto and fixed to the bearing housing 49 at each end of the roller. The blade is then tipped backwardly (i.e. rotated clockwise in the FIG. 5 view) and raised so as to lift the back plates and roller therewith off the ground surface. The binding hinge assembly 64 is next installed by first bringing each binder member 70 in contact with the lower edge of the blade, and then fixing the binder 68 in place using the bolts 70. Each turn buckle 80 is next installed by fixing it at the bottom end with pin 78 to the binding brace 76, and placing the top hook 84 over the gap 56. The adjustment bolt 79 may be adjusted at this point to position the binding brace 76 as shown in FIG. 5. The turn buckles are then tightened to fix the support arrangements to the blade, thereby securing the roller immediately ahead of the blade. The reverse procedure is followed to release the roller and support arrangement from the blade.

Some of the advantages of the present invention may now be better appreciated, particularly with respect to the first embodiment. The roller may be mounted to the blade without any alterations to the blade itself such as drilling bolt holes through the blade or welding supports thereto. The support arrangement 50 allows a variety of roller lengths to be fitted to a given grader blade, so long as the back plates at either end of the roller do not extend beyond the side edges 27 of the blade. The adjustability of the binder members 70 and the turn buckles 80 allows the support arrangement to fit a given blade as its lower edge wears out over time.

A second embodiment of the roller attachment indicated by 100 is shown in FIGS. 7 to 10b. The same reference numerals are used for the same or substantially similar components. The roller attachment 100 is generally similarly located on the road grader 20 as the roller attachment 40 in FIG. 1. The second embodiment differs from the first embodiment in that the location of the support arrangement 102 of the roller attachment 100 is fixed relative to the blade 22, namely it only accommodates rollers which extend approximately the full length of the grader blade.

The support arrangement 102 is removably mounted to the ends of the blade 22, as described later. The arrangement has an arched back plate 104 extending between the blade's upper and lower edges 26, 25, for juxtaposition with the blade's front face 23. The back plate 104 is supported from and fixed, as by welding, along its side edge to a brace assembly, and in particular to a second support element or side plate 106 which extends forwardly and rearwardly of the blade and abuts the side edge 27 thereof. The brace assembly includes a number of hollow tubular brace arms. A horizontal brace arm 110 extending outwardly from a vertical brace arm 112. The vertical brace arm 112 is fixed to the forwardly extending portion of the side plate 106 opposed from the back plate 104, and the arm's lower terminal end forms a mouth 114 for accepting the bearing housing 49 of the roller 42. Fasteners 62, such as conventional bolts or pins, clamp the bearing housing within the mouth 114. Diagonal brace arms 116 add support and stability to the other brace arms 110, 112, and to the support arrangement as a whole. A support shaft 130 extends through the horizontal brace arm 110 and is welded to the diagonal brace arm 116 in the area indicated by 117 in FIG. 9. The support shaft adds flexural rigidity and strength to the horizontal brace arm 110 and the brace arm assembly in general. A rearwardly extending brace arm 118 is fixed at its lower end adjacent the mouth 114 and along its longitudinal edge to the side plate 106. An aperture 120 through the brace arm 118 and the side plate 106 accepts a long bolt 122 which must pass behind the blade's rear face 24, as discussed shortly.

Figure 4:
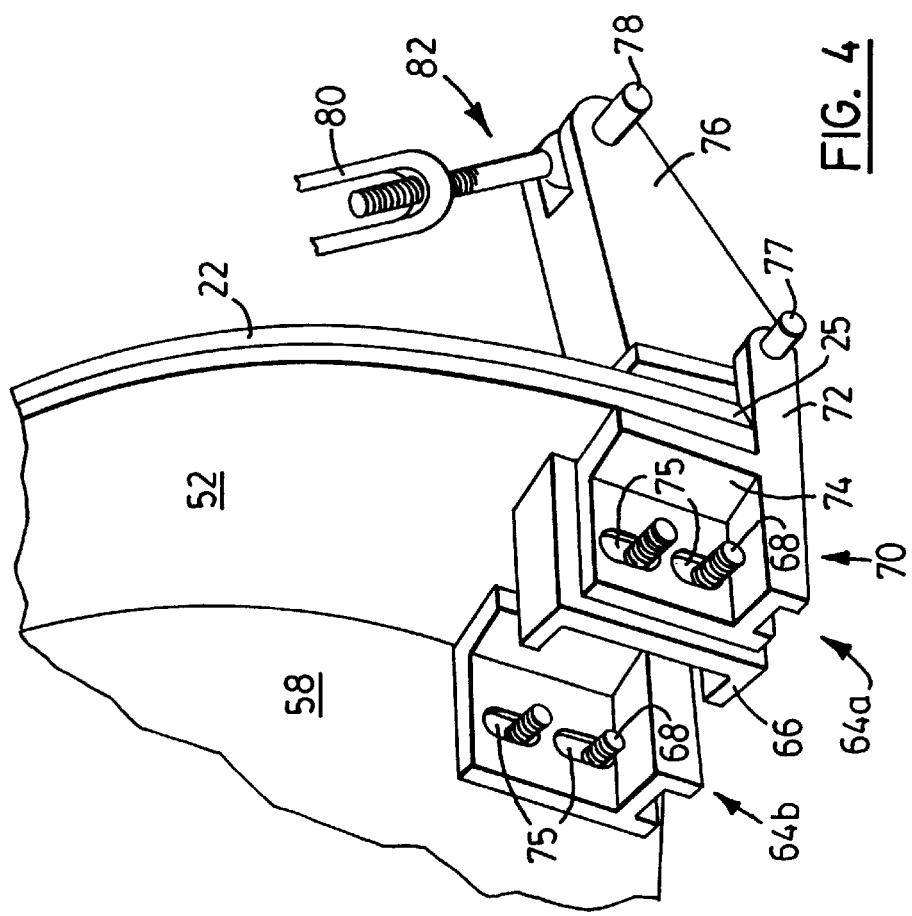
FIG. 4 is a detailed view of an adjustable binding hinge shown in FIGS. 2 and 3.

The binding hinge assembly 64 at the bottom of the back plate 104 is essentially the same as the binding hinge assembly 64b of the first embodiment, except that the hinge assembly 64 is located on the roller side of the back plate 104 (see FIGS. 8 & 9) rather than opposite the roller (as seen in FIGS. 3 & 4). The first puller or turn buckle 124 is pivotally connected at its lower end to the binding brace 76 via second hinge pin 78. Unlike the turn buckle 80 of the first embodiment, however, the top end of the first turn buckle 124 extends only part way up the blade and has an eyelet for receiving the long bolt 122.

Figure 10A:
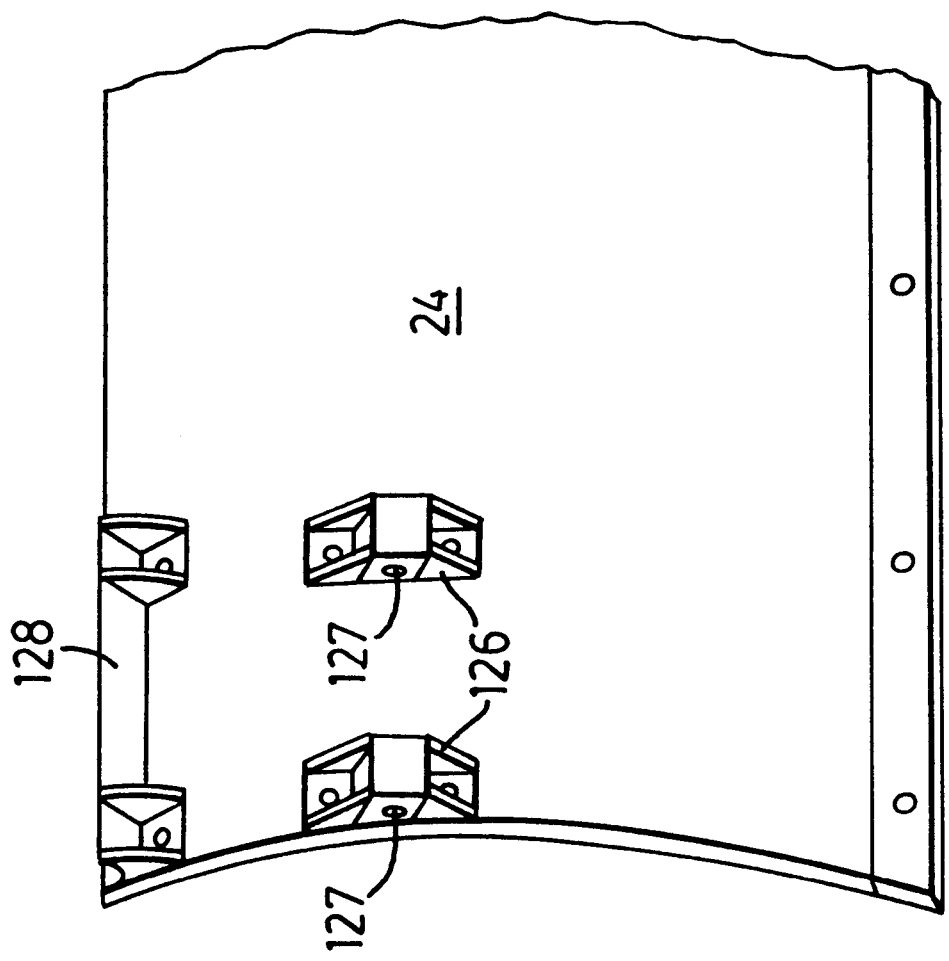
FIG. 10a is the grader blade of FIG. 9 with the roller attachment removed.
Figure 10B:
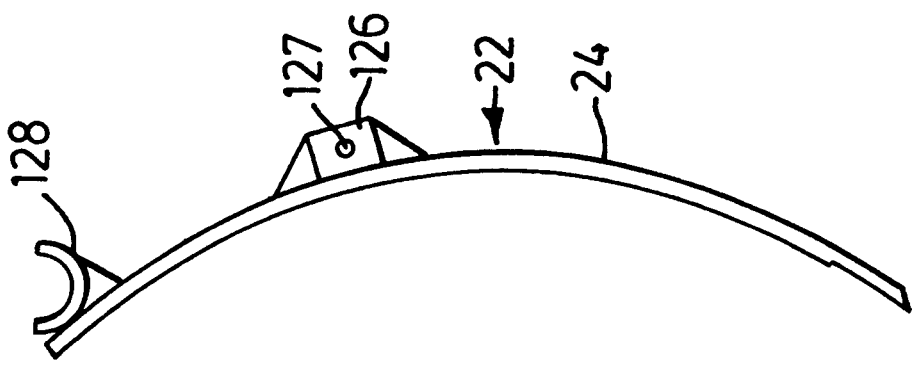
FIG. 10b is a side view of the grader blade of FIG. 10b.

The blade's rear convex face 24, as best seen in FIGS. 9–10b, has two spaced keepers 126 fixed thereto intermediate the blade's lower and upper edges by rivets, welding, or other suitable means. The keepers 126 have openings 127 aligned with the brace aperture 120 for slidably receiving the long bolt 122. The long bolt anchors the top end of turn buckle 124 to the blade. Above the keepers 126 is a trough member 128 appropriately fixed to the blade adjacent its upper edge 26 for receiving and supporting the support shaft 130 extending from the horizontal brace arm 110. A second puller or turn buckle 132, whose lower eyelet is retained on the long bolt 122, has a top hook 133 which fits over the trough member 128 and support shaft 130 and onto the back plate 104 for clamping the support shaft to the blade. The use of the keepers 126 and the two turn buckles in series is particularly suitable where it is desired to keep the turn buckles out of contact with the arched blade.

The installation of the roller and second version of the support arrangement onto the grader blade may now be better appreciated. Some of the procedure is the same as that for the first version above. The roller may be resting in a shallow ditch, and the grader blade is lowered and brought behind the roller so that the roller sits immediately ahead of the blade. At this point the mouths 114 of the support arrangements 102 should already be inserted onto and fixed to the bearing housings 49 at both ends of the roller. The blade is then tipped forwardly so that the top support shaft 130 of each support arrangement is located in and rests in the respective trough 128 at the longitudinal end of the blade. The blade is then tipped backwardly and raised so as to lift the support arrangements and roller therewith off the ground surface. Each binding hinge assembly 64 is next adjusted so that the binder member 70 touches the lower edge of the blade, and is then fixed in place using the bolts 70. The second turn buckle 132 is then hung by hook 133 from the top support shaft 130, and the long bolt 122 is inserted through the aperture 120, through the opening 127 in the first keeper 126, through the eyelets of the first and second turn buckles 124 and 132, and finally through the opening 127 in the second keeper 126. The long bolt 122 is tightened up by nuts at both ends of the bolt or other equivalent means. The second hinge pin 78 is next inserted through the bottom eyelet of the first turn buckle 124, and both turn buckles 124, 132 are then tightened. The roller is now fixed immediately ahead of the blade and ready for working the ground surface 18. The reverse procedure is followed to release the roller and support arrangement from the blade.

In use, the portable roller sits on the ground surface and is pushed ahead of the blade as the grader moves along the ground surface to work the ground, such as packing gravel on a road. The blade and roller may be angled somewhat to the path of travel (i.e. are not positioned transverse to the path of travel) so that the roller skids somewhat over the surface in addition to rolling thereover to enhance the leveling and packing of certain ground surface conditions. It is preferred that the blade's lower edge 25 be above ground surface when using the roller (see FIG. 5) to avoid damaging the binder members 70.

Another advantage of the roller attachment, in its various embodiments, is that it provides a road grader with an efficient means of packing and leveling a road surface. A grader can grade a stretch of dirt road, and then a roller may be mounted to the grader's blade with the present roller attachment to pack the graded stretch of road and thereby provide a more durable surface. Such procedure should extend the life of the road and delay the next required grading and packing. More importantly, however, the present invention also provides an alternative to traditional road grading. Depending on the type of road surface and the extent of damage, use of the roller alone may be sufficient to simultaneously level and pack the road surface without having to first grade with the grader blade. Hence, even greater efficiencies are realized by combining the grading and packing functions. Gravel roads should be most receptive to such wording. Road graders are particularly suitable for such working based on their ability to manipulate the blade carrying the roller to optimally angle the roller to the road surface and to exert an additional downward force, if desired.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below.

What is claimed is:

1. A device for working a ground surface and mountable to an elongate blade of a vehicle which moves said blade along said ground surface and manipulates said blade thereover, said blade having a lower ground engaging edge, an opposed upper edge, a front face and a rear face, said device comprising:

a roller having an elongate body with a continuous cylindrical outer surface for contacting and working said ground surface and an axle element about which said roller rotates wherein a portion of said axle element protrudes from each opposed end of said body; and, an attachment assembly for mounting said roller immediately ahead of said blade, said attachment assembly being removably receivable on said blade and adapted to rotatably hold said roller by said axle element, said attachment assembly comprising:

a support arrangement receivable on each protruding portion of said axle element and being mountable to said blade at any one of a plurality of locations thereon to accommodate a selected roller length, said support arrangement comprising a first support element for engaging said front face of the blade and supportable thereon, a brace assembly fixed to said first support element and extending forwardly therefrom for receiving and carrying the protruding portion of said axle element, and a linkage mechanism for slidably fixing said first support to the blade at a desired location thereon, said first support element comprising an arched plate member juxtaposed with said front face to distribute forces from said roller and brace assembly to said;

wherein the location and orientation of said roller relative to the ground surface is controlled by manipulating said blade.

2. The device of claim 1 wherein said linkage mechanism includes at least one binding hinge slidably connected to a bottom portion of said plate member for gripping the lower edge of said blade, and at least one puller extending along said rear face from said upper edge of the blade to pull said binding hinge against said lower edge of the blade to fix said plate member to said blade.

3. The device of claim 2 wherein said puller comprises a turn buckle having one end pivotally connected to said binding hinge and an opposed hooked end for engaging the upper edge of said blade wherein said turn buckle may be adjusted to provide a desired clamping of said binding hinge against the lower edge of the blade.

4. The device of claim 1 wherein said attachment assembly comprises a support arrangement receivable on each protruding portion of said axle element, said support arrangement being mountable to opposed ends of said blade to accommodate a roller of comparable length as said blade.

5. The device of claim 4 wherein said support arrangement comprises a first support element for engaging said front face of the blade, a brace assembly fixed to said first support element and extending forwardly therefrom for receiving and carrying the protruding portion of said axle element, and a linkage mechanism for fixing said first support element to the blade at one of said opposed ends.

6. The device of claim 5 wherein said linkage mechanism includes at least one binding hinge slidably connected to a bottom portion of said first support element for gripping the lower edge of said blade, and at least one puller extending along said rear face of the blade to pull said binding hinge against said lower edge of the blade to fix said first support element to said blade.

7. The device of claim 6 wherein said linkage mechanism further includes a keeper assembly for fixing to said rear face of the blade intermediate said upper and lower edges, a trough member for fixing to said rear face of the blade adjacent said upper edge, said trough member being adapted to receive and support a portion of said brace assembly, a first puller having one end pivotally connected to said binding hinge and an opposed end operatively coupled to said keeper assembly to provide a desired clamping of said binding hinge against the lower edge of the blade, and a second puller having one end operatively coupled to said keeper assembly and an opposed hooked end for engaging and holding the portion of said brace assembly in said trough member.

8. An assembly for mounting a roller onto a vehicle for manipulating and moving an elongate blade over a ground surface, said blade having a lower ground engaging edge, an opposed upper edge, a front face and a rear face, and said roller having an elongate body with a continuous cylindrical outer surface for contacting and working said ground surface and an axle element about which said roller rotates, said axle element protruding from each opposed end of said body, said assembly comprising:

an attachment for mounting said roller immediately ahead of said blade, said attachment being removably receivable on said blade and adapted to rotatably hold said roller by said axle element, wherein the location and orientation of said roller relative to the ground surface is controlled by manipulating said blade, said attachment comprising a support arrangement receivable on each protruding portion of said axle element and comprising a first support element for engaging said front face of the blade, a brace assembly fixed to said first support element and extending forwardly therefrom for receiving and carrying the protruding portion of said axle element, and a linkage mechanism for fixing said first support element to the blade, said linkage mechanism including at least one binding hinge slidably connected to a bottom portion of said first support element for gripping the lower edge of said blade, and at least one puller extending along said rear face between said upper and lower edges of the blade to pull said binding hinge against said lower edge of the blade to fix said first support element to said blade.

9. The assembly of claim 8 wherein said support arrangement is mountable to said blade at any one of a plurality of locations thereon to accommodate a selected roller length.

10. The assembly of claim 9 wherein said puller comprises a turn buckle having one end pivotally connected to said binding hinge and an opposed hooked end for engaging the upper edge of said blade wherein said turn buckle may be adjusted to provide a desired clamping of said binding hinge against the lower edge of the blade.

11. The assembly of claim 8 wherein said support arrangement is mountable to opposed ends of said blade to accommodate a roller of comparable length as said blade.

12. The assembly of claim 11 wherein said linkage mechanism further includes a keeper assembly for fixing to said rear face of the blade intermediate said upper and lower edges, a trough member for fixing to said rear face of the blade adjacent said upper edge, said trough member being adapted to receive and support a portion of said brace assembly, a first puller having one end pivotally connected to said binding hinge and an opposed end operatively engaged with said keeper assembly to provide a desired clamping of said binding hinge against the lower edge of the blade, and a second puller having one end operatively connected with said keeper assembly and an opposed hooked end for engaging and holding the portion of said brace assembly in said trough member.

13. The assembly of claim 12 wherein a fastener extends between and is operatively coupled with said brace assembly and said keeper assembly, and serves to urge said support arrangement against one of said opposed ends of the blade.

14. In a road grader having an elongate blade for grading a ground surface, the improvement comprising an attachment for mounting a roller immediately ahead of said blade, said roller having an elongate body with a continuous cylindrical outer surface for contacting and working said ground surface and an axle element about which said roller rotates, said axle element protruding from each opposed end of said body, said attachment being removably receivable on said blade and adapted to rotatably hold said roller by said axle element, said attachment comprising a support arrangement receivable on each protruding portion of said axle element, said support arrangement comprising a first support element for engaging said blade, a brace assembly fixed to said first support element and extending forwardly therefrom for receiving and carrying the protruding portion of said axle element, and a linkage mechanism for fixing said first support element to the blade, said first support element comprising an arched plate member substantially following the profile of said front face of the blade to transfer forces from said roller and brace assembly along said front face of said blade.

15. The road grader of claim 1 wherein said linkage mechanism includes at least one binding hinge slidably connected to a bottom portion of said first support element for gripping the lower edge of said blade, and at least one puller extending along said rear face of the blade to pull said binding hinge against said lower edge of the blade to fix said first support element to said blade.

16. The road grader of claim 14 wherein said plate member further includes a hook component for engaging said upper edge of the blade to suspend said plate member therefrom.

* * * * *